United States Patent [19]

Freeman et al.

[11] 4,119,194
[45] Oct. 10, 1978

[54] SYSTEM AND APPARATUS FOR THE ORIENTATION AND BIDIRECTIONAL FEED OF INDICIA BEARING MAIL

[75] Inventors: Gerald C. Freeman, Darien; James F. Mahoney, New Canaan, both of Conn.

[73] Assignee: Pitney-Bowes, Inc., Stamford, Conn.

[21] Appl. No.: 844,236

[22] Filed: Oct. 21, 1977

Related U.S. Application Data

[63] Continuation of Ser. No. 706,577, Jul. 19, 1976, abandoned.

[51] Int. Cl.$^2$ ............................................. B65G 47/24
[52] U.S. Cl. ................................ 198/400; 198/442; 214/1 M; 209/900
[58] Field of Search ............... 198/356, 366, 367, 394, 198/395, 398–400, 371, 405, 442, 436, 528, 601, 622, 372; 209/DIG. 1, 2, 111.5, 111.7 R, 111.7 T; 271/9, 10, 64, 122, DIG. 9; 214/1 M

[56] References Cited

U.S. PATENT DOCUMENTS

| | | | |
|---|---|---|---|
| 2,894,626 | 7/1959 | Mulders et al. | 209/DIG. 1 |
| 2,895,588 | 7/1959 | Van Marle | 198/394 |
| 2,984,349 | 5/1961 | Mathis | 198/356 |
| 3,246,733 | 4/1966 | Torbet et al. | 198/372 |
| 3,411,768 | 11/1968 | Gatti | 271/64 |
| 3,592,326 | 7/1971 | Zimmerle et al. | 198/394 |
| 3,757,942 | 9/1973 | Gunn | 209/DIG. 1 |
| 3,937,455 | 2/1976 | Hauser | 271/122 |

FOREIGN PATENT DOCUMENTS 394,194 1/1974 U.S.S.R. ............................. 198/399

Primary Examiner—Joseph E. Valenza
Attorney, Agent, or Firm—Robert E. Meyer; William D. Soltow, Jr.; Albert W. Scribner

[57] ABSTRACT

A mail handling system and apparatus accepts randomly arranged mail, determines the location of postage indicia on individual pieces and feeds the pieces to separate conveyors in response to the determination of indicia location to orient the same and enables combining the conveyed mail pieces so that the indicia thereon appears entirely on one edge. Feed rollers singulate and feed randomly stacked mail past indicia detectors to a positionable chute-like receptacle which is positioned in response to the detection to eject and direct mail pieces to separate conveyors depending upon whether indicia is present adjacent the right or left edge of the piece as it is presented. The conveyors unite to provide a mail output stream with all indicia either adjacent the leading or trailing edge of the moving piece.

6 Claims, 4 Drawing Figures

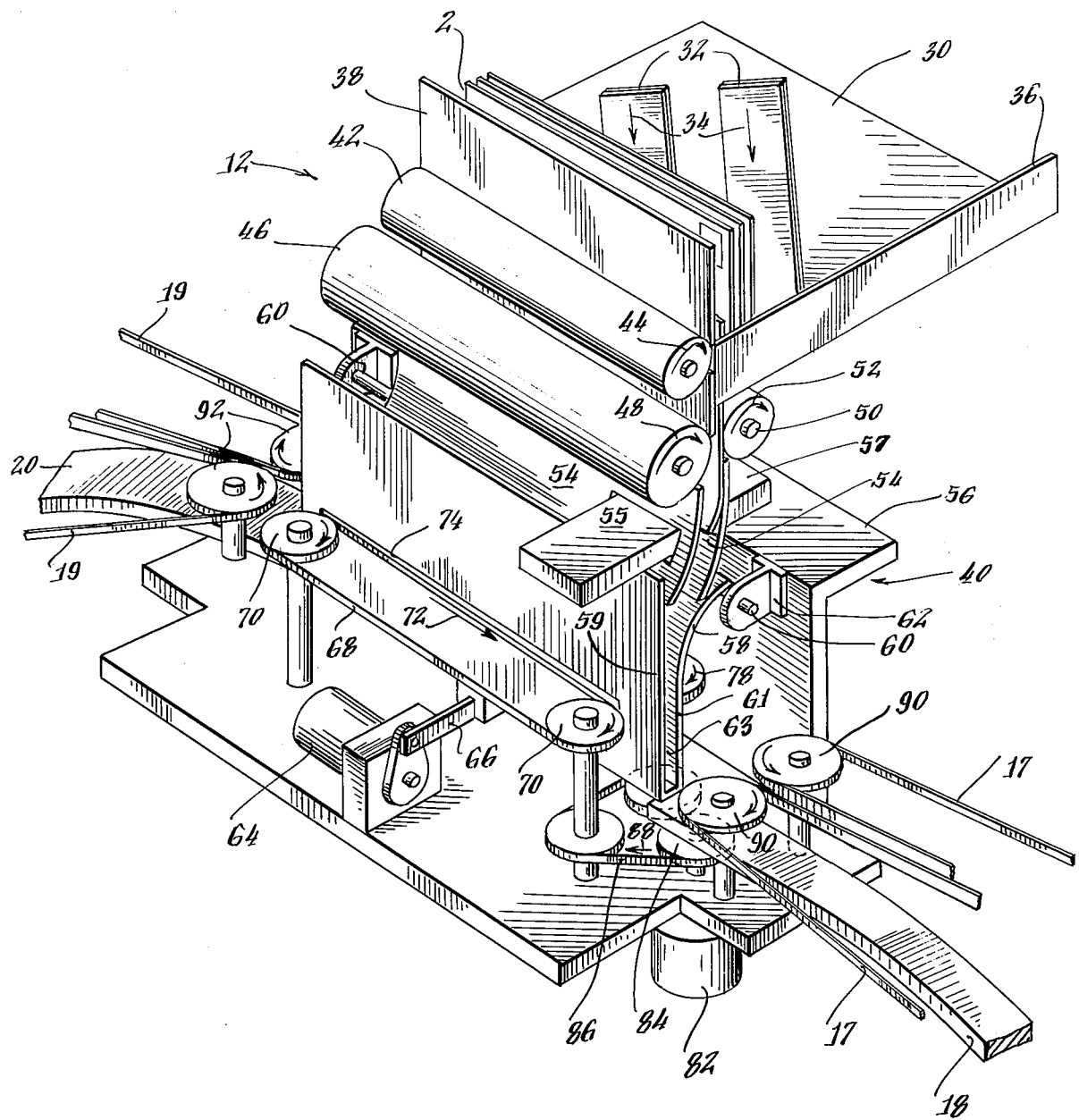

SYSTEM AND APPARATUS FOR THE ORIENTATION AND BIDIRECTIONAL FEED OF INDICIA BEARING MAIL

This is a continuation of application Ser. No. 706,577, filed July 19, 1976, now abandoned.

BAKGROUND OF THE INVENTION

This invention relates to mail handling systems and more particularly to systems and apparatus for orienting and feeding postage indicia bearing mail for further processing such as facing and cancelling of postage.

Automated postal operations have utilized mechanized mail handling systems of varying complexities to convey, orient, and face individual pieces of mail for the cancellation of postage indicia thereon. Pieces of mail, such as envelopes, having their longer edges aligned may nevertheless be randomly oriented with respect to postage indicia so that the indicia may be carried on the front face or reverse face, at the top or at the bottom, or adjacent the right or left edge of the envelope. For convenient cancelling of postage, the mail is desirably oriented and "faced"; that is, all envelopes should be arranged with the postage indicia side facing the same direction when viewed to place the indicia generally in the upper right corner of the envelope.

U.S. Pat. No. 2,929,490 (Stewart) discloses facing and stacking apparatus utilizing complex mechanical and electrical signal operated pneumatic devices for postage indicia orientation. In U.S. Pat. No. 3,140,780 there is disclosed an article conveying system utilizing two branching conveying channels which receive articles from an input channel according to a distribution determined by suction means contained in drums rotating in the conveying channels. U.S. Pat. No. 3,698,538 discloses a pneumatic roll device for facing a singulated letter in response to a stamp detector. Conveying means with transfer switch mechanisms (U.S. Pat. No. 3,612,249) and sheet and card inverters (U.S. Pat. No. 3,523,687) are also known.

Thus, prior art attempts at providing systems for orienting and conveying mail bearing postage indicia have been many and varied. However, the desire to increase system reliability by minimizing the complexity of operating parts, such as are present in the electromechanical-pneumatic devices of the prior art, nevertheless exists.

SUMMARY OF THE INVENTION

The present invention provides a system and apparatus for accepting randomly arranged mail, determining the presence and location of postage indicia on the individual mail pieces and feeding the individual mail pieces bidirectionally in response to the determination of location of indicia to orient the same so that all indicia appears either entirely on the leading edge or entirely on the trailing edge of the conveyed mail pieces.

The mail orienting and feeding apparatus of this invention singulates randomly stacked indicia bearing mail pieces, the edges of which have been registered against the side rail of a feed deck so that the location of the indicia is a predictable position, by receiving them vertically downward between feed and separation rollers. Indicia detectors scan one edge of the single mail pieces during their downward translation to detect whether or not there is postage indicia, such as a stamp or postage meter imprint, on that edge. The mail piece moves down further into a movable chute-like receptacle which is positionable to direct the mail piece to conveyors for further feeding in response to a signal depending upon whether or not indicia is detected to be present on the edge.

The mail receptacle may advantageously be an open ended drop chute pivotable to either of three positions: neutral, in which the mail piece is fed into the chute from the feed roller and remains in the chute, and two opposed, e.g., front and rear, positions, in which ejection means contact the mail piece in the chute to propel the piece to either the left or to the right where further feed is continued by transport belts forming part of separate conveyors aligned with that chute position. The conveyors unite into a single conveyor so that the streams of mail pieces which have been ejected bidirectionally come together in an alignment such that the postage indicia are all present on the lead edge of the mail pieces, at either the top or bottom.

The output of the orienting and bidirectional mail feeding system and apparatus provides a stream of mail pieces having the indicia on either the top or bottom lead edge and therefore the output can be utilized in further mail handling and processing. Thus, the output may be gated to either a bypass or to a 180° twist belt, upon signal from an indicia detector, to function as a letter facing machine and may provide feed to an optical character recognition system. Also the output of the orienting and bidirectional mail feeding system and apparatus can be conveniently fed directly into the facer machine of a facer-canceller apparatus containing an indicia detector and, since there is a bypass and 180° twist belt between the facer and canceller machines, the output of the canceller machine constitutes both faced and cancelled mail.

Another advantage of the mail orienting and feeding system and apparatus of this invention is the provision of a minimum number of signal-operated parts which reduces the need for on-and-off operation of various drive components and provides also for a greater mechanical simplicity in the reduction of articulated and movable elements so that increased reliability is obtained.

While the orienting and feeding system and apparatus of this invention find advantageous utility in postal system mail handling, they are also useful for the processing of other flat, sheet-like articles having other types of indicia thereon and the latter are intended to be encompassed by the term "mail" as used herein.

Accordingly, a feature of this invention is the provision of a mail orienting and feeding system and apparatus for orienting randomly arranged mail and feeding it to provide a single mail stream with the postage indicia on individual pieces thereof all appearing at one edge.

Other features, objects and advantages of this invention will be more apparent from the following detailed description thereof taken in conjunction with the accompanying drawings in which:

BRIEF DESCRIPTION OF THE DRAWINGS

FIG. 2 is an enlarged perspective view of the mail orienting and feeding apparatus for directing the mail pieces shown as part of the system of FIG. 1;

DESCRIPTION OF THE PREFERRED EMBODIMENT

Figure 1:
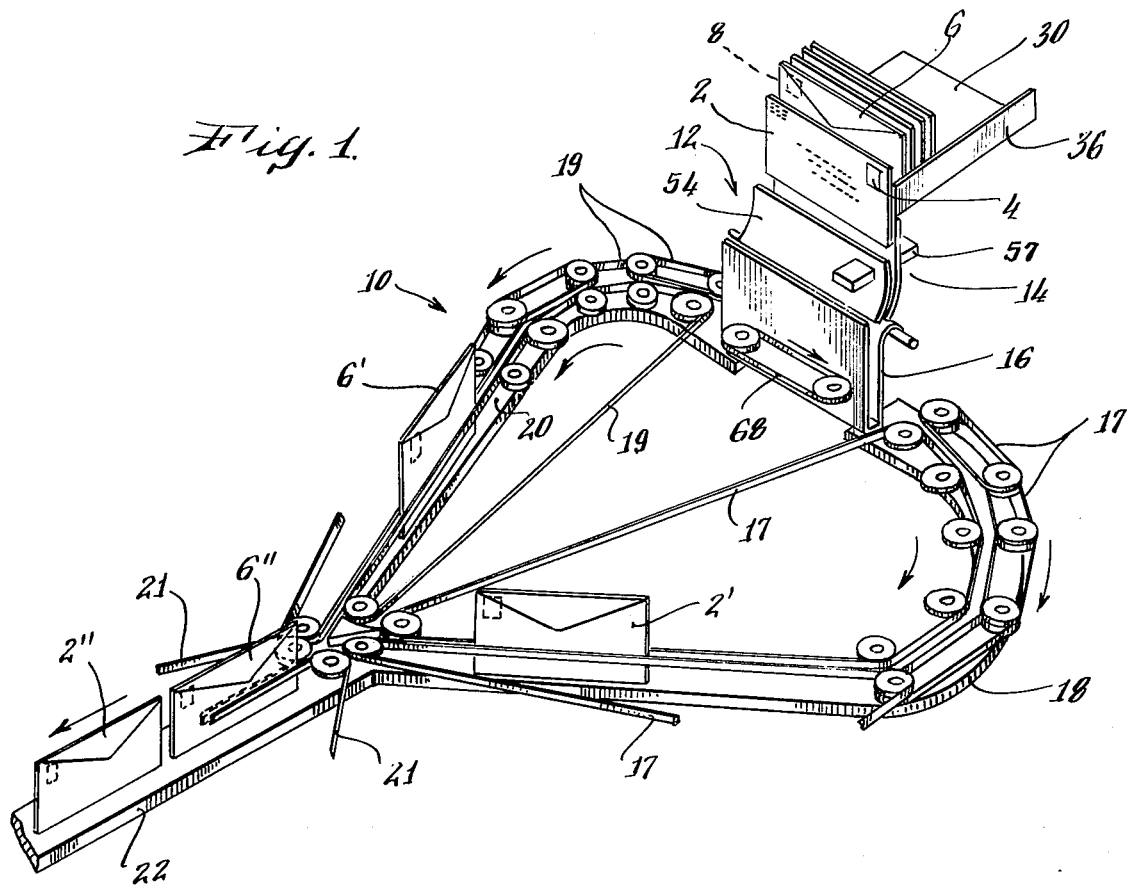
FIG. 1 is a top perspective schematic view of a mail orienting and feeding system and apparatus according to an embodiment of this invention.

FIG. 1 schematically illustrates a mail orienting and feeding system, 10 in which randomly stacked individual mail pieces, such as envelopes 2 and 6, are fed, in a mail feeding station 12, downward past an indicia detecting station 14 to a mail orienting station 16 from which they are either ejected to the right to a conveyor 18 or to the left to a conveyor 20 from whence they are recombined into a single stream in an output conveyor 22.

Referring to FIGS. 1 and 2, there is shown a feed deck 30 in which is placed randomly stacked pieces of mail such as the envelopes 2 and 6. The feed deck 30 includes edge registration belts 32 which move in the direction of the arrows 34 in the plane of the feed deck 30 to urge the individual mail pieces against the side and front registration walls, 36 and 38 respectively.

A mail orienting and feeding apparatus 40 is positioned beneath the feed deck 3. Individual mail pieces are fed downward from the feed deck 30 and into the auxiliary feed roller 42 rotating in the direction of the arrow 44. The mail pieces are singulated by means of the feed roller 46 rotating in the direction of the arrow 48 and the reverse feed roller 50 rotating in the direction shown by the arrow 52, a direction opposite to that of the roller 46 in order to function as a separation roller to assure that the mail pieces are destacked singly, vertically downward.

A letter guide chute 54 guides the individul mail pieces past the indicia detectors 55 and 57 which determine whether or not there is postage indicia on the right edge of the mail pieces. For purposes of clarity of illustration, means to support the feed deck, feed rollers and guide chute are not shown. However, it will be understood that they may be suitably supported and driven as is known, either as part of feed deck or by attachment to the frame 56 of the orienting and feeding apparatus 40.

After passing the indicia detectors 55 and 57, the mail pieces move downward to the chute-like receptacle 58 which is pivotable about the shaft 60 mounted in pivot supports 62 secured to the frame 56.

The chute-like receptacle 58 has longitudinal side walls 59 and 61 extending between the open ends 63 and 65. A stepper motor 64 is mounted on the frame 56 and drives the arm 66 secured to the receptacle 58 for pivoting it to any one of three positions.

Figure 3:
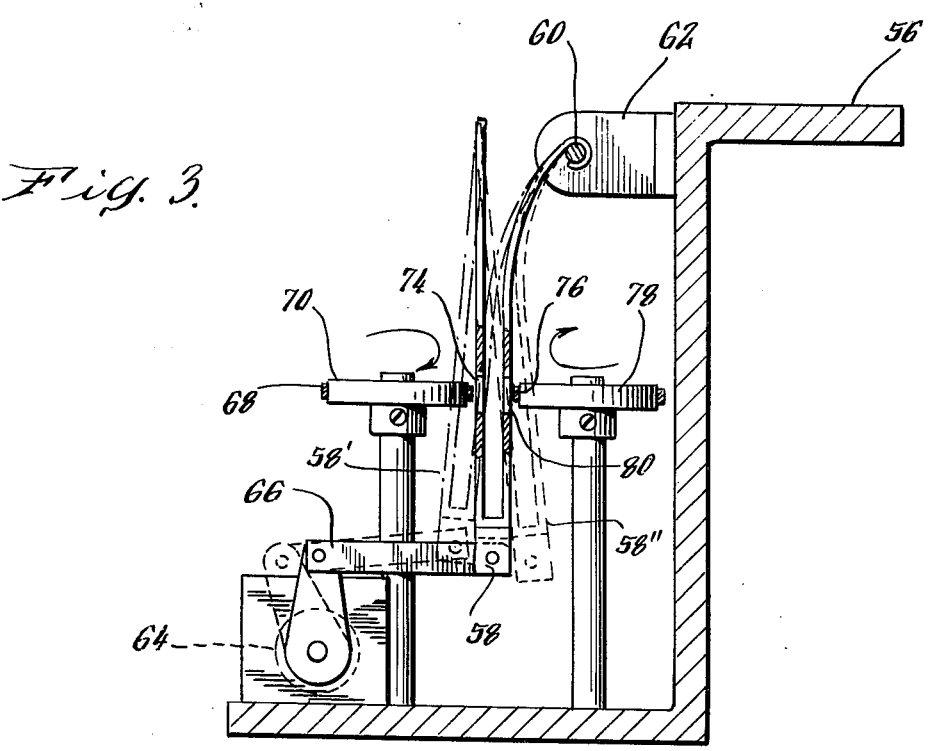
FIG. 3 is a side view, partly in section, of the mail piece chute receptacle of the apparatus shown in FIG. 2, showing its pivotable positions.

The three positions which the chute-like receptacle 58 may assume are best seen in FIG. 3. Thus, the arm 66, when in the position shown in FIG. 2, permits the receptacle to remain in a central or neutral position in which the individual mail pieces drop into it without further movement. When the stepper motor 64 receives a signal from the indicia detectors 55 and 57 in response to the detection of the presence or absence of postage indicia on the right edge of the piece of mail, it operates to activate the arm 66 to swing the chute 58 to the foward position referred to as 58' in FIG. 3. In this position the ejection drive belt 76 rotating on the rollers 70 in the direction shown by the arrow 72 projects through the slot 74 in the front side 59 of the receptacle 58, as best seen in FIG. 3, and frictionally contacts the mail piece therein to eject it to the right out through the open end 61 to the conveyor 18. When no indicia is detected on the right edge of the mail piece thus indicating the indicia is located on the left edge, the stepper motor 64 swings the receptacle to the rear position shown as 58" in FIG. 3 where the ejection drive belt 76 rotating on the rollers 78 in a direction opposite to that of the arrow 72 projects through a slot 80 in the rear side 61 of the receptacle 58 to contact mail pieces therein and eject them to the left out through the open end 65 to the conveyor 20.

The drive motor 82 for the ejection system is secured to the frame 56 and through its drive pulley 84 and the drive belt 66, moving in the direction shown by the arrow 88, drives the ejection drive belt pulleys 70 and 78 continuously without the need for gear boxes or on and off operation in response to electrical signals.

Similar efficiency of operation can be provided for the conveyors 18 and 20 since the conveyor belt pulleys 90 and 92 can obtain their drive directly from pick off rollers, not shown, making contact with the ejection system drive if desired.

An illustration of the bidirectional feeding operation of the mail orienting and feeding system and apparatus of this invention is shown in FIG. 1. An individual piece of mail, the envelope 2, is shown with postage indicia 4 on its front face in the upper right corner. When the envelope 2 drops past the indicia detectors 55 and 57 into the receptacle 58, the ejection belt 68 ejects it to the right into the conveyor 18 where transport belts 17 convey it, now shown as envelop 2', to the output conveyor 22. However, an as envelope 6, the rear of which faces forward so that the postage indicia 8 is adjacent the left edge on the reverse side as viewed in FIG. 1, will be ejected to the left into the conveyor 20 where transport belts 19 will convey it, now shown as envelope 6', to the output conveyor 22. In the output conveyor 22 the output conveyor belts 21 convey a single stream of envelopes, shown as 2" and 6", which now have their indicia all located on the leading edge.

Figure 4:
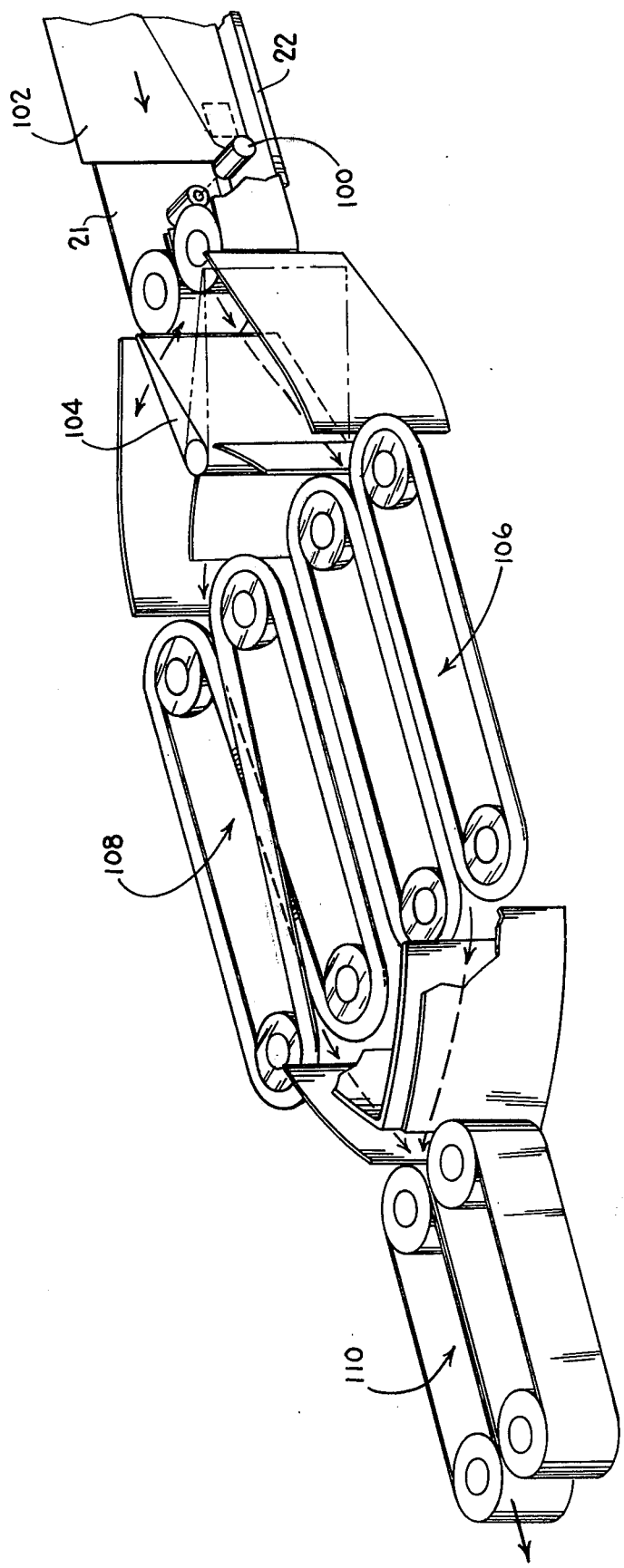
FIG. 4 is a top perspective schematic view of a continuation of the output conveyor shown in FIG. 1 further showing an envelope inverting means which provides an output of completely faced envelope.

In the event that an envelope was present in the stack 12 in an inverted condition with the postage indicia on the right edge reverse side it would be ejected to the right and conveyed to have its postage indicia on a leading edge although such indicia would be on the bottom, reverse of the envelopes 2" and 6" shown in FIG. 1. In this event, the output conveyor 22 can be provided with further indicia detectors which determine if the indicia is on the top or bottom edge and thus generate signals operating gating mechanisms to provide a bypass for such an envelope or to provide means to invert the envelope 180° to face it for alignment with the others. For example, as shown in FIG. 4, an indicia detector 100 in the path of the lower leading edge of envelope 102 will determine the presence of the indicia in this location. Detector 100 will control gate 104 to direct the envelope to either a bypass conveyor 106 when in its solid line position or a 180° inverting means such as twist belt 108 when in its dotted line position. Such a twist belt is shown in U.S. Pat. No. 2,947,406 to Hazelton. The bypass conveyor 106 and twist belt 108 then merge into a common feed path 110, providing a flow of envelopes all having their indicia located at a common position which could then serve as input for further processing, such as feed to an optical character recognition system for additional operations that the user may desire. Alternatively, the bypass conveyor 106 and twist belt 108 may be omitted and the output may go directly to a facer-canceller machine having facing and cancelling devices with a bypass and 180° twist belt between them and an indicia detector in each so that the final output constitutes a stream of faced and cancelled mail.

What is claimed is:

1. A mail handling apparatus for feeding envelope mail pieces according to the location of postal indicia thereupon comprising:
   A. feeding means for individually feeding mail pieces in a downward direction;
   B. a chute-like receptacle means located directly below said feeding means for receiving mail pieces fed downwardly from said feeding means, said receptacle means being positionable to at least two positions;
   C. a first conveyor means comencing adjacent one end of said receptacle and aligned with one of said receptacle positions.
   D. a second conveyor means comencing adjacent the other end of said receptacle and aligned with said other receptacle position.
   E. an indicia detection means located between said feeding means and said receptacle for detecting the location of postage indicia on each mail piece fed thereby and for controlling the positioning of said receptacle means; and
   F. ejection means operatively located at each position of said receptacle means for ejecting each mail piece from the receptacle means to one of the aligned conveyor means.

2. A mail handling apparatus as claimed in claim 1 in which the receptacle means comprises an open top chute having a bottom support means for supporting the mail pieces, side support means for supporting the mail pieces on their sides between their right and left edges, the side support means extending between open ends through which the mail pieces are directed, the ejection means comprises at least a pair of mail piece engaging rotating means which project through openings in the side support means to engage mail pieces in the receptacle and frictionally direct them to the conveying means, one of the pair of rotating means being located on the side of the receptacle at one of the receptacle positions aligned with the one conveying means and the other being located at the other conveying means aligned position in a manner such that effective engagement with a mail piece occurs for that rotating means only when the receptacle is in a position proximate to the rotating means.

3. A mail handling apparatus as claimed in claim 2 wherein the rotating means both rotate in the same direction so that mail pieces are directed out of the receptacle means in opposite directions.

4. A mail handling apparatus as claimed in claim 3 wherein the rotating means comprises endless belts.

5. A mail handling apparatus as claimed in claim 4 wherein the rotating ejection means and the conveying means are all directly driven by a single power drive source.

6. A mail handling apparatus as claimed in claim 2 wherein the receptacle means is pivotally supported and further comprising actuation means joined to the receptacle means for pivotably positioning it for directing the mail pieces, the actuating means acting in response to a signal from the indicia detection means to position the receptacle means in different positions aligned with the conveying means depending upon whether the postage indicia is detected as being located on the right edge or the left edge of the mail piece.

* * * * *

UNITED STATES PATENT AND TRADEMARK OFFICE
CERTIFICATE OF CORRECTION

PATENT NO. : 4,119,194
DATED : October 10, 1978
INVENTOR(S) : Gerald C. Freeman - James F. Mahoney It is certified that error appears in the above-identified patent and that said Letters Patent are hereby corrected as shown below:

Column 3, line 28, change "feed deck 3" to read -- feed deck 30.

Column 3, line 67, change "drive belt 76" should read -- drive belt 68 --.

Column 4, line 16, change "belt 66" to read -- belt 86 --.

Column 4, line 34, remove the word "as".

Claim 6, column 6, line 28, change "pivotally" to read -- pivotably --.

Signed and Sealed this

Fourth Day of December 1979

[SEAL]

Attest:

SIDNEY A. DIAMOND

Attesting Officer

Commissioner of Patents and Trademarks